US005079569A

United States Patent [19]

Bunch, Jr.

[11] Patent Number: 5,079,569

[45] Date of Patent: Jan. 7, 1992

[54] LASER PRINTER WITH PAPER POSITIONING AND TENSIONING FEATURES

[75] Inventor: Earnest B. Bunch, Jr., Phoenix, Ariz.

[73] Assignee: B. Bunch Company, Inc., Phoenix, Ariz.

[21] Appl. No.: 659,695

[22] Filed: Feb. 25, 1991

[51] Int. Cl.[5] .................... G01D 15/24; B65H 18/26; B65H 20/00

[52] U.S. Cl. .................... 346/136; 346/76 L; 226/95; 226/195; 242/147 A

[58] Field of Search .............. 346/136, 76 L; 226/195, 226/95; 242/147 A

[56] References Cited

U.S. PATENT DOCUMENTS 2,710,153 6/1955 Baumrucker, Jr. et al. ... 242/147 A
3,259,288 7/1966 Wassermann .................. 226/195
3,961,335 6/1976 Gordon ...................... 346/136

*Primary Examiner*—Benjamin R. Fuller
*Assistant Examiner*—Gerald E. Preston
*Attorney, Agent, or Firm*—Tod R. Nissle

[57] ABSTRACT

Apparatus for processing with a laser printer a fresh strip of paper from a large supply roll of paper. The apparatus utilizes a tensioning unit to compensate for lateral travel of paper strip dispensed from the supply roll, to remove paper dust from the paper strip, and to maintain a moderate tension on the paper strip to facilitate processing of the strip.

7 Claims, 2 Drawing Sheets

LASER PRINTER WITH PAPER POSITIONING AND TENSIONING FEATURES

Figure 1:
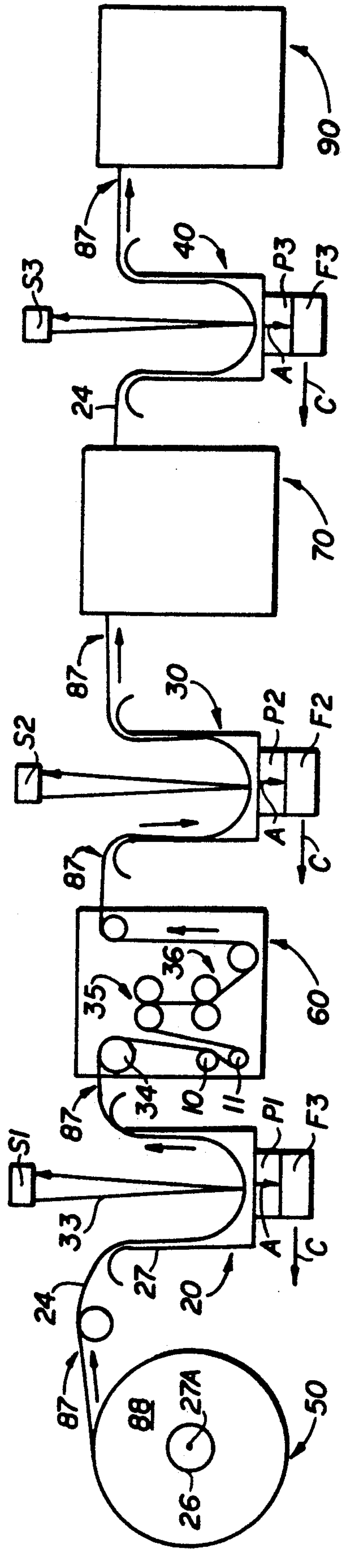

This invention relates to apparatus for processing a web of paper or other material.

More particularly, the invention relates to apparatus for processing with a laser printer a fresh strip of paper from a large supply roll of paper, the apparatus substantially reducing the cost of each paper supply roll required to supply fresh paper for processing by the laser printer.

In another respect, the invention relates to apparatus which enables a large supply roll of paper which is unevenly wound to be processed through a laser printer.

In a further respect, the invention relates to apparatus which, while processing through a laser printer a strip of paper from a large supply roll, minimizes the fire and health hazards posed by fine paper dust which is carried by paper from the supply roll.

The utilization of large supply rolls of paper strip to feed printers, bursters, collators, and inserters is well known in the art. See, for example, U.S. Pat. No. 4,893,763 to Wales et al. Such large supply rolls of paper typically have a diameter of about fifty inches and, when the paper is being fed into a laser printer, have spaced apart transverse lines of weakening formed along the paper strip and have spaced apart tractor pin apertures formed at equal intervals along the edges of the paper strip. Paper from such a supply roll ordinarily moves through a slack loop, through a series of tensioning rollers, and into a laser printer. The slack loop is intended to provide "give" in the paper strip in the event the laser printer unexpectedly slows or advances in speed with respect to the supply roll. Several disadvantages are associated with the foregoing prior art paper supply roll apparatus. First, large supply rolls of paper which have transverse lines of weakening and apertures formed along the edges of the paper are costly, and typically each have a price tag in the range of from $1000.00 to $1200.00. Second, while the slack feed loop which is used in the strip of paper intermediate the supply roll and laser printer does tend to compensate for variances in the speed of performance of the laser printer, a tensioned paper feed is preferred for laser printers and for most, if not all, other types of paper processing equipment because it improves the control of the paper strip. Third, paper supply rolls of paper which have been perforated and have been punched along the edges produce a significant amount of paper dust, which poses health and fire hazards. Further, and perhaps most importantly, the paper dust fouls the operating mechanisms of the laser printer and increases the maintenance required to keep the laser printer operating efficiently.

Accordingly, it would be highly desirable to provide an improved paper supply apparatus which would reduce the cost of paper required to feed a laser printer, which would permit paper traveling intermediate the supply apparatus and the laser printer to be tensioned, which would significantly reduce the paper dust carried and broadcast by paper from the supply apparatus, and, accordingly, which would increase the efficiency of operation of and decrease the cost of operation of a laser printer which was receiving paper from the paper supply apparatus.

Therefore, it is a principal object of the invention to provide improved paper supply apparatus.

It is another object of the invention to provide improved paper supply apparatus which reduces the risk that a laser printer which is receiving a strip of paper from the paper supply apparatus will encounter operating difficulties due to paper dust carried on the strip of paper.

A further object of the invention is to provide improved paper supply apparatus which reduces by over 50% the cost of paper required to supply a laser printer or other paper processing equipment.

Still another object of the invention is to provide improved paper supply apparatus which tensions a paper strip as the strip travels intermediate the supply apparatus and a laser printer or other piece of paper processing equipment.

Yet still another object of the invention is to provide improved paper supply apparatus which can utilize a roll of paper which does not have transverse lines of perforation and does not include tractor pin apertures formed along the edges of the roll of paper.

Figure 2:
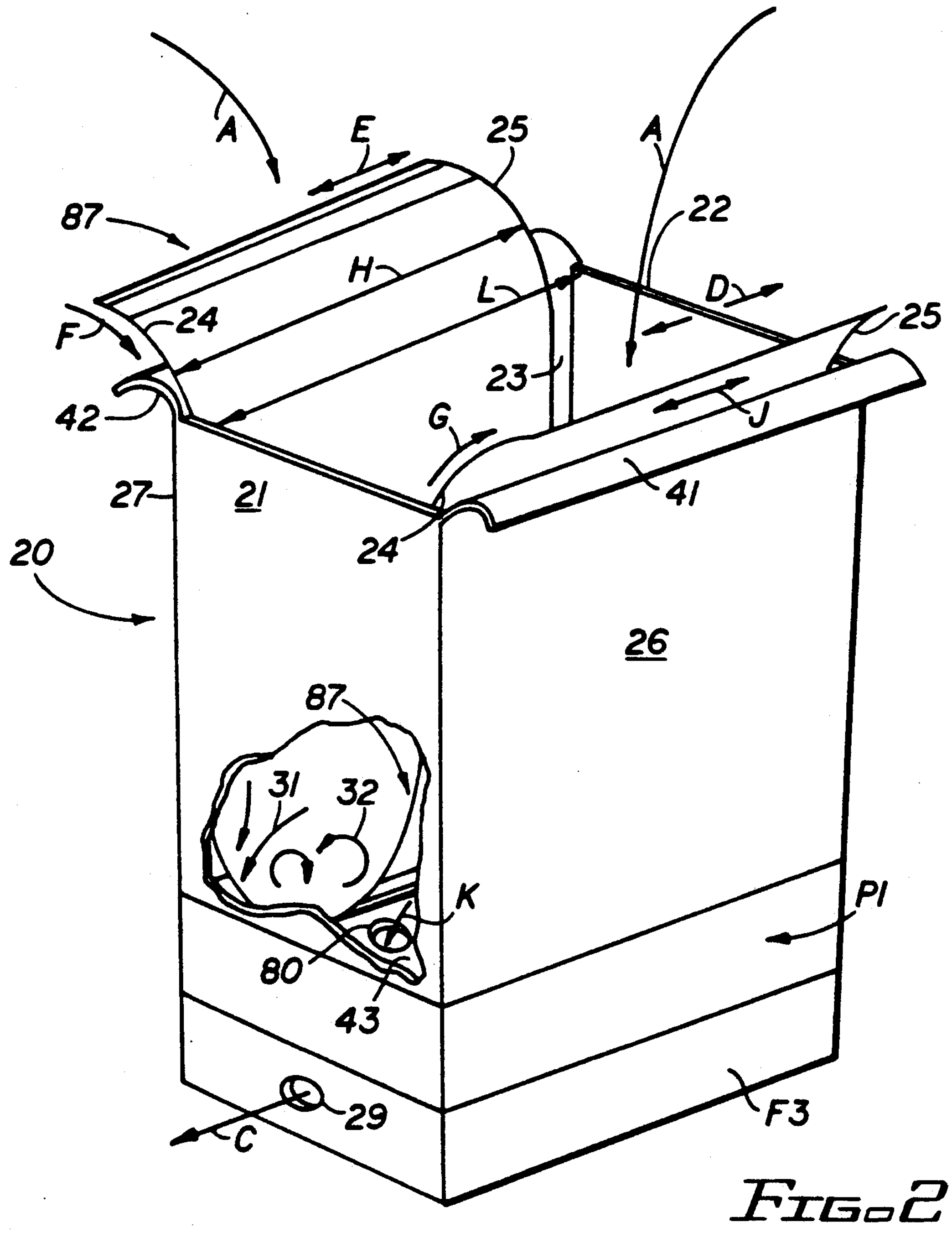

These and other, further and more specific objects and advantages of the invention will be apparent to those skilled in the art from the following detailed description thereof, taken in conjunction with the drawings, in which:

FIG. 1 is a side schematic view of apparatus constructed in accordance with the principles of the invention; and, FIG. 2 is a perspective view illustrating a paper tensioning unit from the apparatus shown in FIG. 1.

Briefly, in accordance with my invention, I provide apparatus for processing an elongate strip of paper moving along a path of travel through the apparatus. The paper strip has a pair of spaced apart generally parallel elongate peripheral edges. The peripheral edges have a selected shortest distance therebetween. The apparatus includes paper supply means for dispensing the strip of paper moving through the apparatus; a first paper tensioning chamber adapted to accept the strip of paper dispensed by the supply means to cause the strip of paper to move through a tensioned loop while passing through the chamber and to dispense the strip of paper from the chamber; paper processing means for receiving the strip of paper dispensed by the chamber and processing the strip of paper to form in the strip at least one of the pair comprising transverse lines of weakening and spaced apart apertures formed along at least one of the peripheral edges, the paper processing means dispensing the processed paper; a second paper tensioning chamber adapted to accept the processed strip of paper from the processing means and to cause the strip of paper to move through a tensioned loop while passing through the chamber and to dispense the strip of paper from the chamber; laser printing means for receiving the paper strip dispensed by the second paper tensioning chamber and imprinting the paper strip and for dispensing the imprinted paper strip; and, means for applying vacuum pressure to the first and second chambers to tension the loop in each of said chambers.

Turning now to the drawings, which depict the presently preferred embodiments of the invention for the purpose of illustrating the practice thereof and not by way of limitation of the scope of the invention, and in which like reference characters refer to corresponding elements throughout the several views, FIGS. 1 and 2 illustrate paper processing apparatus constructed in accordance with the principles of the invention. In FIG. 1, paper supply roll 50 dispenses a strip or web 87 of paper or other material. The paper strip 87 in roll 50 is wound around elongate cylindrical spindle 26. Spindle 26 has an elongate axis 27A which is perpendicular to the plane of the sheet of paper on which FIG. 1 is drawn. Strip of paper 87 has a pair of elongate, spaced apart, generally parallel side or peripheral edges 24 and 25. In FIG. 1, edge 24 defines the circular side face 88 of roll 50 which circumscribes spindle 26. If paper strip 87 is evenly wound when roll 50 is manufactured, then peripheral edge 24 lies in a plane which passes through face 88 and is perpendicular to axis 27A. However, when strip 87 is wound on spindle 26 to form roll 50, strip 87 often is not evenly wound and, as a result, portions of strip 87 on roll 50 are laterally displaced from other portions of strip 87 when strip 87 is wound around spindle 26 to form roll 50. When some portions of strip 87 are laterally displaced with respect to other portions of strip 87 on roll 50, then the entire length of peripheral edge 24 does not lie in a common plane which coincides with face 88. Instead, some sections of edge 24 are laterally displaced with respect to other portions of edge 24 in directions perpendicular to the plane of the sheet of paper on which FIG. 1 is drawn, i.e., some portions of edge 24 are displaced with respect to other portions of edge 24 on roll 50 in directions indicated by arrows E in FIG. 2. When the paper strip 87 on roll 50 is unevenly wound in this fashion, the position of paper strip 87 as it is dispensed from roll 50 in FIG. 1 laterally travels or moves back and forth in directions indicated by arrows E in FIG. 2. Such lateral movement of the position of strip 87 as it is dispensed from roll 50 can cause difficulties when an edge 24, 25 of strip 87 is, during lateral traveling of the strip, forced against a fixed paper guide and when the fixed guide causes the edge 24, 25 to crumple or deform. Paper feed or control apparatus for certain types of processing equipment, for example laser printers, may not allow for much, if any, lateral travel or displacement of paper being fed into the processing equipment. Each paper tensioning chamber 20, 30, 40 is designed to permit the safe input into the tensioning chamber 20, 30, 40 of paper which laterally travels and to dispense paper from the chamber in a fashion which eliminates or minimizes lateral travel of the strip of paper 87.

Paper tensioning chamber 20 includes front 26 and rear 27 panel members or walls upwardly depending from suction unit P1. Unit P1 includes a fan or other means which draws air downwardly through apertures 80 in the direction of arrow K in FIG. 2. Apertures 80 are formed in the floor 43 of unit 20. Unit P1 causes air to flow into chamber 20 in the directions indicated by arrows A. Air drawn through apertures 80 into unit P1 is directed into filter F3. Filter F3 removes paper particles from the air. The filtered air exits filter F3 through aperture 29 in the direction of arrow C in FIG. 2. When suction unit P1 draws air into chamber 20, the air attempts to flow intermediate edges 24, 25 and the sides 22, 27 of chamber 20. Some of the air drawn into chamber 20 contacts and cannot pass through strip 87. This air is eventually drawn in a lateral direction toward an edge 24, 25 of the paper and passes between the edge and a side 22, 27 of chamber 20. Arrow 31 illustrates air flowing laterally over the surface of strip 87 toward edge 24. The interfering by strip 87 of the flow of air through chamber 20 into unit P1 also creates turbulence or eddies 32 adjacent at least a portion of strip 87. The lateral air flow indicated by arrow 31 and the turbulent air flow indicated by arrow 32 tend to produce a "sweeping" effect which removes particles of paper from strip 87 and draws these particles into unit P1.

Removal of paper particles or dust from strip 87 is important because the particles tend to foul laser printers and other equipment and because the particles can pose potential health and fire hazards. Consequently, an important function of unit 20 is to clean strip 87 as it is dispensed from roll 50. Unit 20 also gently releasably tensions, and therefore controls, strip 87 as it is dispensed from roll 50. Spindle 27 presently is turned by a variable speed motor. The motor (not visible in FIG. 1) is controlled by sensor S1. Sensor S1 determines the quantity or length of paper in chamber 20 at any given instant in time by measuring the distance 33 from sensor S1 to the bottom of the paper loop in chamber 20. When the quantity of paper in chamber 20 exceeds a selected value, then the speed of the motor driving spindle 27 is reduced. When the quantity of paper in chamber 20 is less than a selected value, the speed of the motor driving spindle 27 in increased.

Chamber 20 also releasably tensions paper strip 87 as it travels into perforating machine 60. Strip 87 passes over driven roller 24 and moves around fixed tensioning rolls 10 and 11. Roller pair 35 forms transverse lines of weakening or perforation at selected intervals along strip 87. Roller pair 36 punches holes along at least one edge 24, 25 of strip 87. The holes punched along the edge or edges of strip 87 are shaped and spaced to receive tractor pins which pass through the holes and transport strip 87. The tractor pins are typically carried on an endless belt and are used in laser printers and other equipment to control the movement of strip 87. After strip 87 is processed by machine 60 and is dispensed, it is received by paper tensioning chamber 30. The structure and function of paper tensioning chamber 30 is identical to that of chamber 20. Chamber 30 releasably tensions paper dispensed by machine 60 and tensions paper fed into laser printer 70 or into other paper processing apparatus. After strip 87 is processed and dispensed by laser printer 70, it is received by paper tensioning chamber 40. Paper tensioning chamber 40 is identical in structure and function to chamber 20. After paper strip 87 is dispensed by chamber 40, it is received by spiral paper folding machine 90. Machine 90 includes a chute for alternately distributing transverse lines of weakening in strip 87 in opposite directions of travel, and includes spirals and beaters for receiving and folding strip 87 dispensed by the chute. The spirals and beaters fold strip 87 in zig-zag fashion along transverse lines of weakening in strip 87. Unit 40 tensions strip 87 as it is fed into folder 90.

At least one of side walls or panels 21 and 22 is laterally adjustable in the direction indicated by arrows D in FIG. 2 so that the distance, indicated by arrows L, between parallel walls 21 and 22 can be adjusted. The distance L between side walls 21 and 22 normally is greater than the shortest distance, indicated by arrows H, between peripheral edges 24 and 25 of strip 87. Distance H is less than distance L so that when strip 87 laterally travels in the directions indicated by arrows E there is "play" or adequate space between walls 21 and 22 so that an edge 24, 25 will not be crumpled, damaged or bent against a wall 21, 22 while strip 87 is dispensed into chamber 20 from an unevenly wound roll 50. Further, the space 23 between an edge 25 and side wall 22 promotes the formation of turbulent air flow 32 which removes paper dust from strip 87. Even though strip 87 entering chamber 20 over arcuate lip 42 may travel in the directions indicated by arrows E, strip 87 exiting chamber 20 over arcuate lip 41 tends to travel laterally in the directions of arrows J a lesser amount or not at all because the lower part of the loop formed by strip 87 in chamber 20 pivots or twists with respect to the portion of strip 87 traveling over lip 41. Accordingly, the depth of the loop is great enough so that the weight of the paper in the loop, along with the tension in the loop imposed by the action of unit P1, tends to absorb, compensate for, and eliminate the lateral travel in strip 87. By the time strip 87 leaves chamber 20, any lateral travel in the directions indicated by arrows J is minimized or eliminated. The bottom of U-shaped loop of strip 87 in chamber 20 is normally above and spaced apart from the floor 43 of chamber 20.

Sensor S2 monitors the quantity of paper in chamber 30. When the quantity of paper in chamber 30 is less than a selected amount, sensor S2 instructs machine 60 to increase its output. When the quantity of paper in chamber 30 is more than a selected amount, sensor S2 instructs machine 60 to decrease its output. If desired, sensor S2 can instruct roll 50 to increase or decrease its output based on the quantity of paper in chamber 30. Sensor S2 can also instruct printer 70 to decrease or increase its input when the quantity of paper in chamber 30 is less than or greater than a desired quantity.

Sensor S3 monitors the quantity of paper in chamber 40. When the quantity of paper in chamber 40 is less than a selected amount, sensor S3 instructs printer 70 to increase its output. When the quantity of paper in chamber 40 is more than a selected amount, sensor S3 instructs printer 70 to decrease its output. If desired, sensor S3 can instruct folder 90 to increase or decrease its output based on the quantity of paper in chamber 40. Sensor S1, S2 or S3 can also simultaneously instruct roll 50, machine 60, printer 70, and folder 90 to decrease or increase their output when the quantity of paper in chamber 40 is more than or less than a desired quantity.

The apparatus of the invention permits fresh paper to be drawn from a roll 50, perforated, and directed into a laser printer in one continuous operation. The apparatus compensates for a roll 50 on which strip 87 is unevenly wound, compensates for the production of paper dust in line such that the risk is minimized that paper will foul a laser printer or other equipment, and maintains in the paper the tension necessary to permit the ready perforation and control of a strip of paper moving through the apparatus. The apparatus of the invention does not require that at some point the strip of paper be loose or form a slack freely hanging loop to compensate for variations in the speed of operation in line paper processing machines.

Paper strip 87 can not be pulled from roll 50 by a driven roller if the paper strip is wound unevenly about spindle 27 with some portions of the edges of the paper strip laterally displaced from other edge portions of the strip. Pulling paper strip 87 from an unevenly wound roll 50 with a driven roller likely would tear or damage the strip. The suction chamber 20 of the invention applies a moderate tension to paper strip 87 dispensed from roll 50 to take the slack out of the paper while at the same time allowing the paper strip lateral play to compensate for the lateral travel of the paper strip which occurs when the strip is unevenly wound about spindle 27. This feature of the invention is especially important because the paper strip should be tensioned as it enters perforating machine 60.

Sensors S1, S2, S3 can comprise units which utilize light, sound, or other electromagnetic waves to gauge the distance between the sensor S1, S2, S3 and the bottom of the paper loop. Sensors S1, S2, S3 can be located at any desired position with respect to paper tensioning chambers 20, 30, 40. Sensors S1, S2, S3 can also utilize mechanical means or any other desired means to determine the quantity or position of the paper strip in the chambers 20, 30, 40.

Sensors S1, S2, and S3 preferably are used to control the speed of operation of roll 50, machine 60, and machine 90 and not to control the speed of operation of laser printer 70. This permits roll 50, machines 60 and 90, and chambers 20, 30, 40 to be utilized in conjunction with any laser printer without requiring that the laser printer be adapted to work with the other equipment in FIG. 1 or vice-versa. Roll 50 and machines 60 and 90 adapt to the speed at which the laser printer 70 is operating.

Chamber 20 releasably tensions paper strip 87 by forming a tensioned loop which will, if pulled on, give without permitting strip 87 to be damaged. For example, if roll 50 were to reverse its normal direction of rotation the paper loop in chamber 20 would permit strip 87 to be pulled out of chamber 20 back toward roll 50 without tearing strip 87. If the speed of the perforating machine increases, strip 87 can be pulled from chamber 20 at a speed which reduces the size of the paper loop in chamber 20 without tearing the paper strip 87.

In another embodiment of the invention, the side walls 21 and 22 of chamber 20 are adjusted so that the distance represented by arrows L is equal to or only slightly larger than the shortest distance, indicated by arrows H, between edges 24 and 25, and so that edges 24, 25 contact or are very near sides 21, 22, respectively. When the width H of paper strip 87 is therefore about equal to the distance between walls 21 and 22, the suction generated by unit P1 is sufficient to cause portions of the edges 24 and 25 of strip 87 near the bottom of the loop which strip 87 forms in chamber 20 to bend small distances and then return to a normal position. When portions of the edges 24, 25 bend they permit air to flow intermediate edges 24, 25 and side walls 21, 22. The bottom of the loop formed by strip 87 in chamber 20 is the curved lower portion of the loop near floor 43 in FIG. 2. When portions of edges 24, 25 bend and return to a normal position, such portions can act much like a vibrating reed. The vibration or movement of these portions of the edges 24 and 25 facilitate the loosening and removal of paper dust from the surfaces of strip 87. Suction unit 20 can also cause air to be drawn downwardly underneath strip 87 toward floor 43. Air flowing downwardly underneath strip 87 passes intermediate the loop in chamber 20 and wall 26, 27. Air flowing downwardly intermediate the paper loop in chamber 20 and wall 27 can cause the portion of strip 87 adjacent rear wall 27 to undulate. Both the undulation of the portion of strip 87 passing near wall 27 and the vibration or movement of the portions of edges 24, 25 in the lower portion of the loop and adjacent side walls 21, 22 make the loop pliable and fluid such that the loop can, without damage to strip 87, absorb and compensate for lateral travel of strip 87 as it is dispensed from roll 50 into chamber 20.

Having described my invention in such terms as to enable those skilled in the art to understand and practise it, and having identified the presently preferred embodiments thereof,

I claim:

1. Apparatus for processing an elongate strip of paper moving along a path of travel through the apparatus, said paper strip having a pair of spaced apart generally parallel elongate peripheral edges, said edges having a selected shortest distance therebetween, said apparatus including (a) paper supply means for dispensing said strip of paper moving through said apparatus;

(b) a first paper tensioning chamber adapted to accept said strip of paper dispensed by said supply means and to (i) cause said strip of paper to move through a tensioned loop while passing through said chamber, and (ii) dispense said strip of paper from said chamber;

(c) paper processing means for receiving said strip of paper dispensed by said chamber and processing said strip of paper to form in said strip at least one of the pair comprising (i) transverse lines of weakening, and (ii) spaced apart apertures formed along at least one of said peripheral edges, said paper processing means dispensing said processed paper;

(d) a second paper tensioning chamber adapted to accept said processed strip of paper from said processing means and to (i) cause said strip of paper to move through a tensioned loop while passing through said chamber, and (ii) dispense said strip of paper from said chamber;

(e) laser printing means for receiving said paper strip dispensed by said second paper tensioning chamber and imprinting said paper strip and for dispensing said imprinted paper strip; and, (f) means for applying vacuum pressure to said first and second chambers to tension said loop.

2. The apparatus of claim 1 including (a) a third paper tensioning chamber for receiving said imprinted paper strip dispensed by said laser printing means, causing said strip of paper to move through a tensioned loop while passing through said chamber, and dispensing said strip of paper after it passes through a loop in said third chamber;

(b) means for receiving said strip of paper dispensed by said third chamber and folding said strip of paper; and, (c) means for applying vacuum pressure to said third chamber to tension said loop.

3. The apparatus of claim 1, wherein said vacuum pressure means (a) draws an air stream over at least a portion of said loop to remove paper dust from said strip of paper and into said air stream; and, (b) filters said air stream to remove paper dust therefrom.

4. The apparatus of claim 1 including (a) variable speed motor means for turning said supply roll of paper to dispense said strip of paper therefrom;

(b) sensor means for determining the length of said strip of paper in said loop in said first paper tensioning chamber and for generating paper quantity signals representing the length of paper in said loop in said first paper tensioning chamber; and, (c) control means for receiving said paper quantity signals and for increasing the speed of said motor means when said length of paper in said loop is less than a selected value.

5. Apparatus for processing an elongate strip of paper moving along a path of travel through the apparatus, said paper strip having a pair of spaced apart generally parallel elongate peripheral edges, said apparatus including (a) paper supply means for dispensing said strip of paper moving through said apparatus;

(b) at least one paper tensioning chamber adapted to accept said strip of paper dispensed by said supply means, to cause said strip of paper to move through a tensioned loop while passing through said chamber, and to dispense said strip of paper from said chamber;

(c) processing means for receiving said strip of paper dispensed by said tensioning chamber and processing said strip;

(d) suction means for applying vacuum pressure to said tensioning chamber to (i) tension said loop, and, (ii) draw an air stream over at least a portion of said loop to remove paper dust from said strip of paper, and (iii) discharge said stream of air containing said paper dust;

(e) filter means for receiving said discharged stream of air and removing at least a portion of said paper dust from said stream of air.

6. Apparatus for processing an elongate strip of paper moving along a path of travel through the apparatus, said paper strip having a pair of spaced apart generally parallel elongate peripheral edges, said edges having a selected shortest distance therebetween, said apparatus including (a) paper supply means for dispensing said strip of paper moving through said apparatus, and including (i) a roll of said paper strip, said roll including a central axis about which said strip is wound, said roll being unevenly wound such that first portions of one of said elongate edges in said roll are positioned in directions parallel to said axis and away from second portions of said one of said elongate edges in said roll, and said one of said elongate edges only partially lies in a common plane, said common plane being perpendicular to said axis, and (ii) means for rotating said roll to dispense said paper strip from said roll, the position of said paper strip on leaving said roll traveling laterally from side to side due to said strip being unevenly wound on said roll;

(b) a first paper tensioning chamber adapted to accept said strip of paper dispensed by said supply means and to (i) cause said strip of paper to move through a loop while passing through said chamber, and (ii) dispense said strip of paper from said chamber;

said chamber including (iii) a pair of spaced apart side walls each adjacent one of said sides of said strip of paper, and (iv) means for adjusting at least one of said side walls of said chamber such that the space between said side walls is greater than said shortest distance between said sides of said paper strip, and, permits said paper strip dispensed from said roll into said chamber to travel a selected distance laterally between said side walls without forcing one of said edges toward the other; and, (c) paper processing means for receiving said strip of paper dispensed by said chamber and processing said strip of paper.

7. The apparatus of claim 1 wherein said first paper tensioning chamber includes (a) a pair of spaced apart side walls each adjacent one of said sides of said strip of paper; and, (b) means for adjusting at least one of said side walls of said chamber such that the space between said side walls (i) is greater than said shortest distance between said sides of said paper strip, and (ii) permits said paper strip dispensed by said paper supply means to travel a selected distance laterally between said side walls without forcing one of said edges toward the other.

* * * * *